(12) United States Patent
Wobben (10) Patent No.: US 7,287,962 B2
(45) Date of Patent: Oct. 30, 2007

(54) CONSTRUCTION APPARATUS AND METHOD FOR A WIND POWER INSTALLATION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/529,313

(22) PCT Filed: Sep. 22, 2003

(86) PCT No.: PCT/EP03/10518

§ 371 (c)(1),
(2), (4) Date: Aug. 17, 2005

(87) PCT Pub. No.: WO2004/038215

PCT Pub. Date: May 6, 2004

(65) Prior Publication Data

US 2006/0013689 A1    Jan. 19, 2006

(30) Foreign Application Priority Data

Sep. 27, 2002  (DE) ............................ 102 45 078

(51) Int. Cl.
*F03D 11/04* (2006.01)
(52) U.S. Cl. ........................ 416/244 R; 416/DIG. 6; 415/905
(58) Field of Classification Search ......... 416/DIG. 6; 415/905, 907, 908; 248/910; 52/40, 651.01, 52/741.14
See application file for complete search history.

(56) References Cited

U.S. PATENT DOCUMENTS 5,531,419 A    7/1996  Gustafsson et al. ......... 248/519

(Continued)

FOREIGN PATENT DOCUMENTS

AT    380 079    4/1986

(Continued)

OTHER PUBLICATIONS

Kuwahara, T., et al., "Prefabricated Building System for Radio Relay Stations," *Communication Laboratories* 27(3-4):236-250, Mar.-Apr. 1979.

*Primary Examiner*—Richard A. Edgar
(74) *Attorney, Agent, or Firm*—Seed IP Law Group PLLC (57) ABSTRACT

Wind power installation technology has seen dramatic developments in the last 20 years. In the meantime there are installations of the order of magnitude of up to 5 MW and future development leads to an expectation of installations with an even greater nominal power. The present application does not preferably concern such megawatt installations but rather small installations, in particular a small wind power installation of between about 50 and 150 kW nominal power, which can be set up practically at any location in the world as independently as possible of intensive machine support. The object of the present invention is to simplify the erection of a wind power installation. A wind power installation comprising a plurality of installation parts such as rotor, generator, machine casing and pylon, wherein the installation parts are disposed in a container during transport to the building site of the wind power installation and are assembled to form a wind power installation at the location of construction of the wind power installation, wherein the container is such that it accommodates the pylon of the wind power installation and forms the foundation of the wind power installation.

11 Claims, 5 Drawing Sheets

U.S. PATENT DOCUMENTS

| | | |
|---|---|---|
| 6,408,575 B1 | 6/2002 | Yoshida et al. ................ 52/40 |
| 2006/0137348 A1* | 6/2006 | Pas .......................... 60/641.1 |

FOREIGN PATENT DOCUMENTS

| DE | 689 10 982 T2 | 4/1994 |
|---|---|---|
| DE | 43 22 980 C2 | 10/1994 |
| DE | 196 44 299 A1 | 4/1998 |
| DE | 102 26 996 A1 | 4/2003 |
| WO | WO 01/44585 A1 | 6/2001 |
| WO | WO 02/27105 A1 | 4/2002 |
| WO | WO 02/41444 A1 | 5/2002 |
| WO | WO 02/056411 A2 | 7/2002 |

* cited by examiner

CONSTRUCTION APPARATUS AND METHOD FOR A WIND POWER INSTALLATION

BACKGROUND OF THE INVENTION

The present invention relates to structures to support and set up a wind power installation, and more particularly to setting up a wind power installation that is of a smaller scale, such as 50 to 150 kw average power production.

FIELD OF THE INVENTION

Wind power installation technology has seen dramatic developments in the last 20 years. In the meantime there are installations of the order of magnitude of up to 5 MW and future development leads to an expectation of installations with an even greater nominal power. The present application does not preferably concern such megawatt installations but rather small installations, in particular a small wind power installation of between about 50 and 150 kW nominal power, which can be set up practically at any location in the world as independently as possible of intensive machine support.

DESCRIPTION OF THE RELATED ART

Hitherto, for the production of the wind power installations, it is usual for individual components of the wind power installation, for example the pylon, the rotor, the rotor blades, the generator, the machine casing, the transformer, the control electronics and so forth to be transported individually to the erection location, and assembled there. In that respect, erection of the pylon usually requires a crane which is also needed for positioning the machine casing and for mounting the rotor and the generator. The individual parts of the installation are taken to the place at which the wind power installation is to be erected, by means of trucks.

BRIEF SUMMARY OF THE INVENTION

One object of the present invention is to simplify the erection of a wind power installation.

According to the invention that object is attained by the features of claim 1. Advantageous developments are set forth in the appendant claims.

In the wind power installation according to the invention all the components thereof or in one embodiment, all essential components are transported in one or more standard containers (for example 20 foot by 40 foot). The advantage of such standard containers is that there are sufficient transport means for that purpose, such as for example truck container transporters, by means of which the containers can also be transported on land. In addition such standard containers have long been in use for shipping and accordingly the entire shipment even of a plurality of installations in a plurality of containers can be effected in a simple manner by container ships. In addition there are in the meantime many aircraft which are capable of taking a standard container as the payload in the aircraft fuselage.

With the installation according to the invention, the transport container or a plurality of such transport containers which previously have accommodated the individual components of the installation is now also used for erecting the wind power installation. Thus for example a container forms the entire foundation of the wind power installation. For that purpose such a container can be provided with a suitable connection to the base of the pylon of the wind power installation.

That can be effected on the one hand by the provision at the outside on the container of at least one flange having a row of bores, through which can be screwed screws which can then also accommodate the corresponding pylon base or pylon base flange of the wind power installation so that the pylon base of the wind power installation is then screwed to the container connection. To weight down the container so that it also represents a sufficiently high foundation weight, the container can be filled with sand, concrete, water or another medium.

The use of the container as a foundation, in accordance with the invention, has the particular advantage that an adequate foundation arrangement from the factory is thus also already supplied with the installation from the factory and, if the wind power installation is to be set up a very remote area, a foundation can be laid in a very simple manner, for which purpose hitherto a steel structure filled with concrete has usually been employed in the prior art. (See the book by Erich Hau, 1996 'Windkraftanlage', pages 388, 389 and 390).

In addition, in the case of the wind power installation according to the invention, the transformer and also the entire control arrangement can already be fixedly installed in the container at a predetermined location at the factory so that, after the wind power installation has been erected, it will be brought into operation very quickly without very complicated cable connections having to be made between the generator and the control arrangement and the transformer.

It is also particularly advantageous if the wind power installation has at least one cable winch which is motor-driven or which is to be driven manually. If the cable is guided over a suitable auxiliary carrier (support frame with deflection roller) which is to be mounted to the container, at least the pylon of the wind power installation can be erected and, with a suitable further cable guide arrangement on the pylon or the machine casing, further components of the installation such as the generator, the rotor and so forth can be lifted to hub height, without the use of a building crane being required for that purpose.

In order to improve the stability and steadiness of the installation, it is also possible for the container which is to form the foundation of the installation to be buried in the ground at the location at which the wind power installation is to stand, so that only the top side of the container or the upper parts of the container project out of the ground.

In order further to improve the stability and steadiness of the foundation, it can also be provided that, in the case of a container to be buried, openings are let into various side walls of the container (or have been let into the side walls in the factory), through which tubes, rods or other bracing members are then driven into the ground surrounding the container and those tubes, rods or other bracing members are then connected to the container, whether by welding, screwing, clamping or in some other fashion.

If the entire control arrangement or all essential electrical components such as control cabinets, power cabinets, transformers and so forth are already fixedly disposed at the factory in the 'foundation container' or a further container, then after the installation components have been erected, it is then only necessary to provide the cable connections between those components and the generator on the one hand and the power supply network on the other hand, so that the entire assembly procedure for the wind power installation is possible using very simple means and the entire process of setting up the regulating equipment of the wind power installation can already be carried out at the factory.

BRIEF DESCRIPTION OF THE DRAWINGS

The invention is described in greater detail hereinafter by means of an embodiment illustrated in the drawing in which.

DETAILED DESCRIPTION OF THE INVENTION

Figure 1:
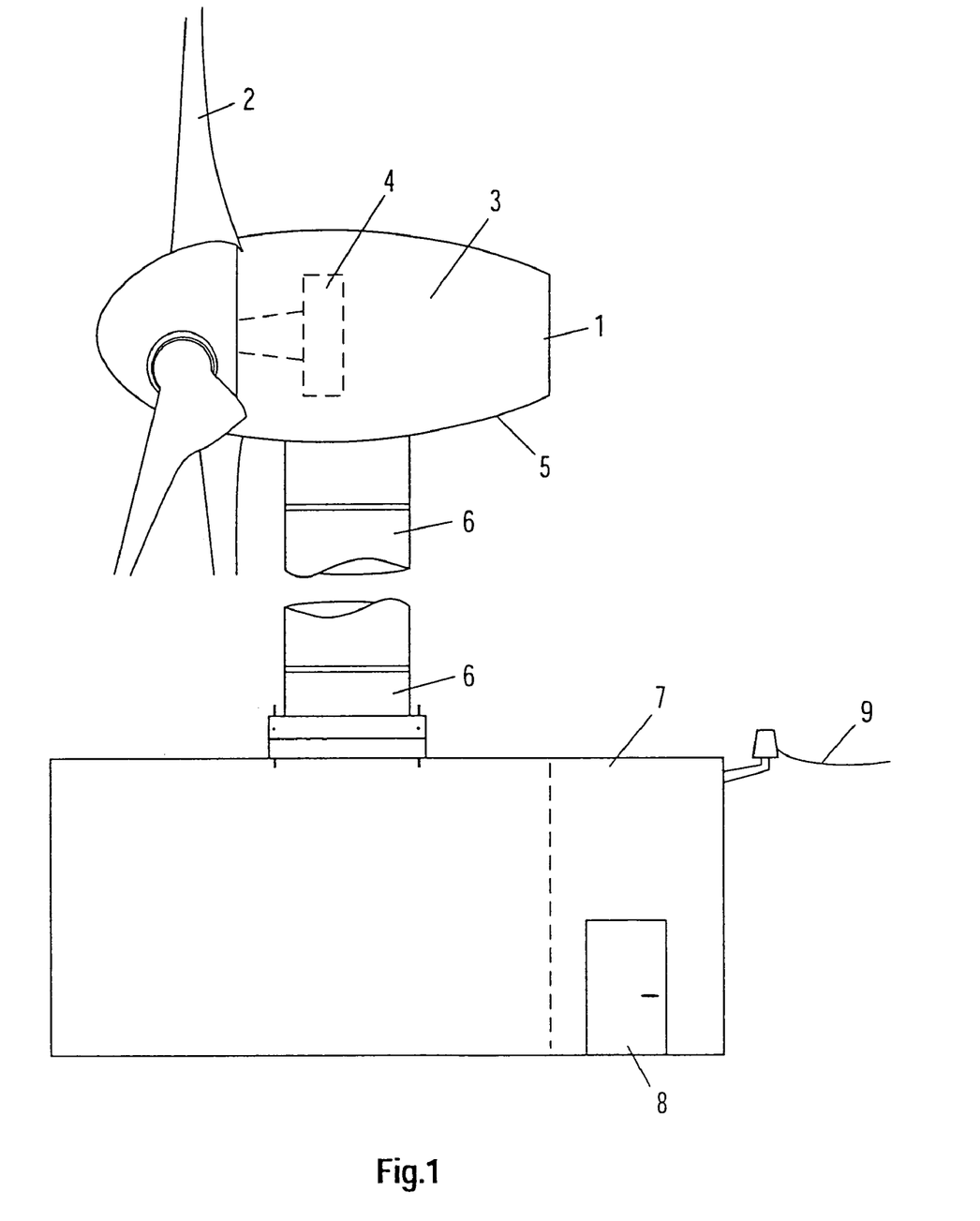
FIG. 1 shows a first alternative embodiment of the invention (base module)

FIG. 1 is a view in principle of a wind power installation according to the invention comprising a rotor 1 with three rotor blades 2 which are carried by a machine casing 3 and coupled to a generator 4 in the machine casing. The entire machine casing is protected by a cladding also called a pod 5 and is carried by a pylon 6 which in turn is carried by a container 7. The container in turn has an entrance 8 leading to a space within the container 7, within which are disposed the items of equipment for controlling and regulating the installation as well as the transformer of the wind power installation, with which the electrical power produced is transformed to the network level so that the electrical power can be fed into the electrical network to which the wind power installation is connected.

So that the container can afford adequate stability and steadiness and thus form an adequate foundation, the foundation is filled with sand or another weighting material, for example water, in those parts of the interior not required for any components or parts of the installation.

In FIG. 1 the pylon is placed with its base on the top side of the container and fastened there. For that purpose the container has a suitable flange or a corresponding attached part which has a row of bores which is the same as a corresponding row of bores at the underside of the pylon flange so that the two parts can be fixedly fastened, to each other such as by bolts, rivets, screws, or the like.

The pylon comprises individual portions or sections which are of such a length that they can be accommodated by the container. If for example a 40 foot (about 13 meters) standard container is used, it is therefore readily possible for the individual tower sections to be of a length of about 36 feet or 12 m.

The further components of the machine casing or the rotor can also be individually transported within the container, in which respect it is also certainly possible for individual components to be disposed in an already pre-assembled condition within the container, for example a machine carrier together with a journal and a generator mounted thereon with its rotor and its stator so that, at the place of manufacture, the entire assembly procedure can be of the utmost simplicity.

Figure 2:
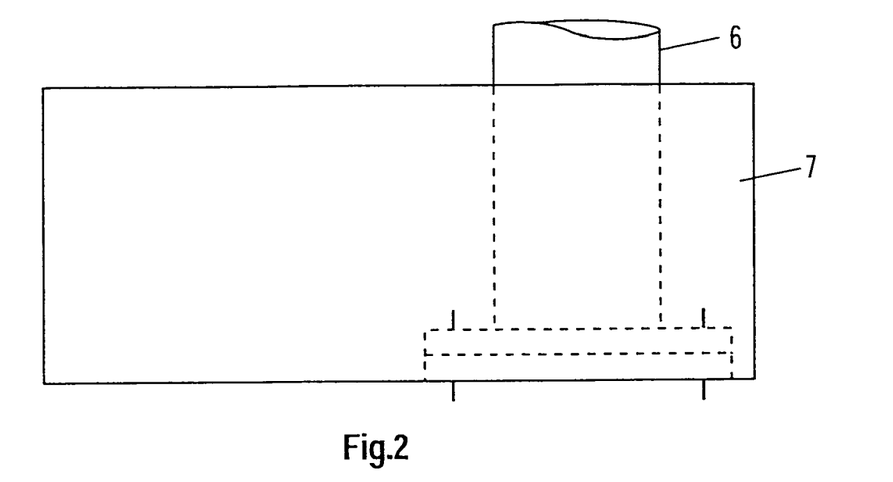
FIG. 2 shows a view in cross-section through the container of the installation of FIG. 1.

FIG. 2 shows an alternative embodiment to FIG. 1, wherein the alternative is essentially that the pylon base is not fitted on to the top side of the container but that provided in the top side of the container is a receiving means, through which the lower region of the pylon can be passed so that then the pylon base can be arrested on the bottom of the container at holders provided at that location. That arresting action can again be formed by screwing fasteners, bolts or by other mechanical fixings.

A peripherally extending ring is fitted in the region of the container receiving means at the top side of the container, the ring providing for sealing the pylon and the container on the one hand, and also providing for good transmission of forces from the pylon to the container on the other hand.

Figure 3:
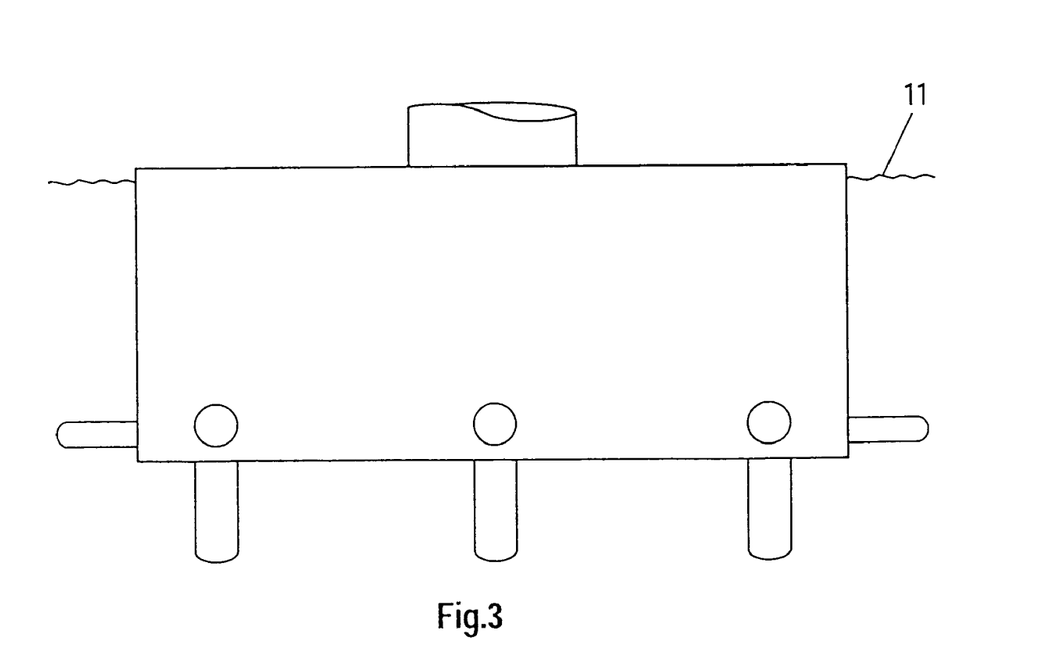
FIG. 3 shows a further alternative embodiment of the invention.

FIG. 3 shows a further variant of the invention where the container does not stand on the ground but is let into the ground 11 and in addition provided in the container bottom and in the container wall therearound are a plurality of openings through which tubes, rods or other bracing members can be driven into the surrounding earth. Those tubes, rods or bracing members are in turn connected to the container wall, for example by screwing, and provide for enhanced stability and steadiness of the wind power installation even under very rough wind conditions when very high forces have to be transmitted to the foundation.

Figure 4:
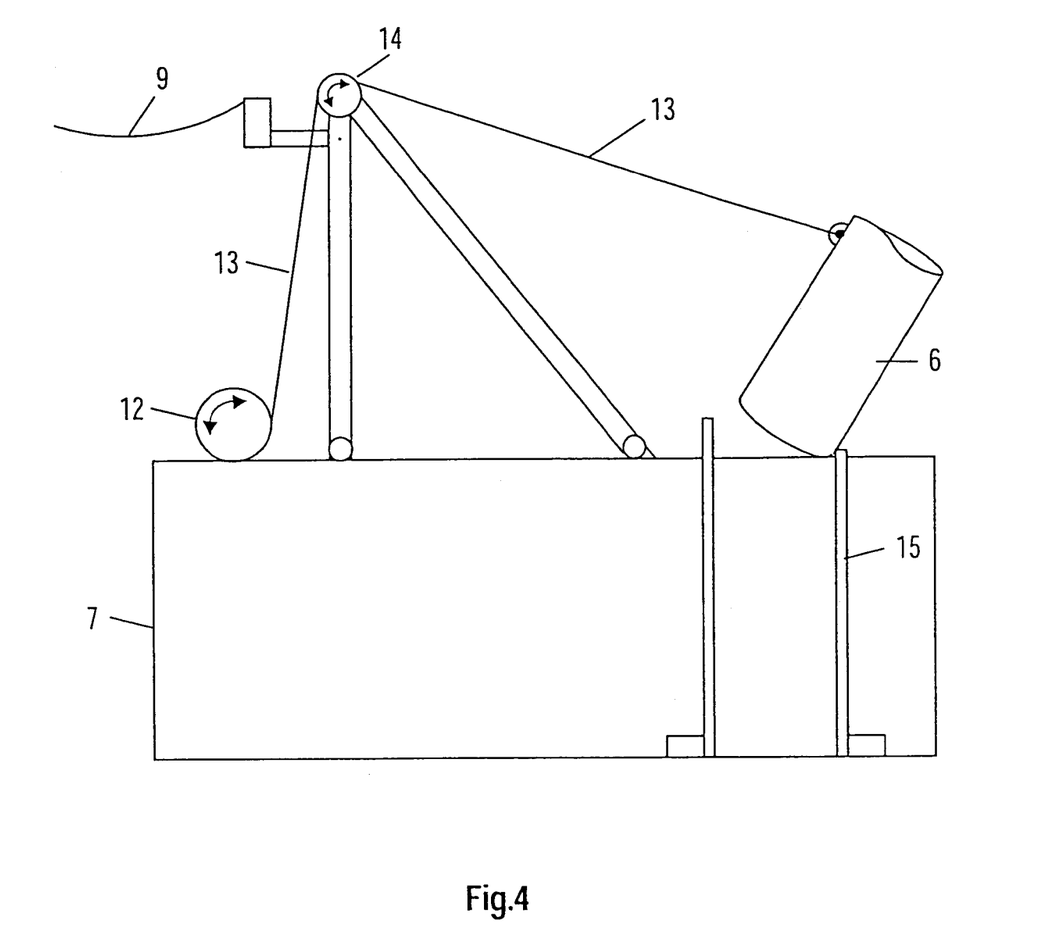
FIG. 4 is a view in principle of the invention during the erection of the wind power installation.

FIG. 4 is a view in principle showing how a wind power installation according to the invention can also be erected without a crane. For that purpose a cable winch 12 is mounted to the container. The cable winch can have a motor drive provide with electric power on power line 9, but it can also be operated manually (in particular with a good step-down transmission). The cable winch has a cable 13 which is fixed to the pylon of the wind power installation over a direction-changing roller 14 mounted to a support frame (further direction-changing rollers are also possible). The direction-changing roller is carried by a support frame which extends away from the container in order to provide an adequate lever action for the grip on the pylon 6. The pylon, can be completed assembled on the ground, in one example. When now the completed pylon is slowly raised, the pylon 6 which initially is in a horizontal position can be slowly erected into a vertical position and is then introduced for example into a tube 15 which is fixedly let into the container. That tube 15 performs the function of a socket sleeve which later embraces the pylon insofar as it projects into the interior of the container. The tube 15 permits the pylon to be safely and securely let down into the container.

If the overall machine casing is not of an excessively large mass, then the overall machine casing can also already be mounted to the pylon itself before the pylon is erected, so that, after the pylon has been erected, all the mechanical components of the wind power installation are already in position.

If however individual parts on the machine casing or of the pod have to be conveyed to the top of the pylon, it is advantageous if a direction-changing arrangement is mounted on the machine casing, and then individual components can be raised to the top of the pylon by means of the direction-changing arrangement and can be fitted to the top of the pylon, such as the pod 5 and the blades 2.

Figure 5:
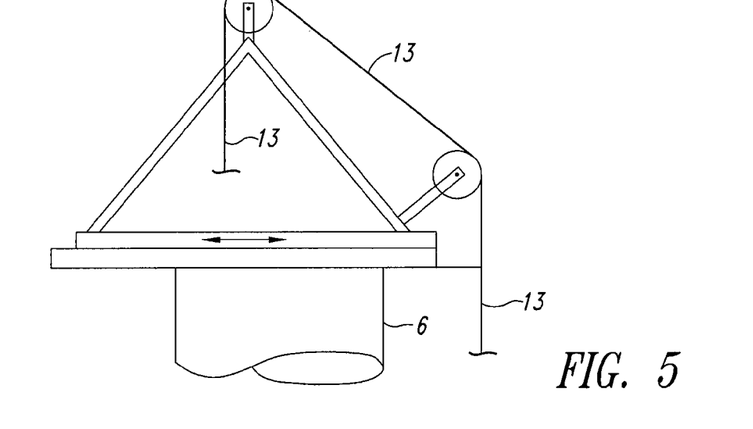
FIG. 5 is a view in principle of an individual part of the wind power installation in the direction of the pylon.

FIG. 5 shows such a structure in principle, wherein two cable rollers are carried by a suitable support arrangement mounted on the machine casing. If in addition the support arrangement is also displaceable in the direction indicated by the arrow (FIG. 5), then the most widely varying components can be raised in the most widely varying planes, for example journal, generator as well as the rotor or individual rotor blades.

Figure 6:
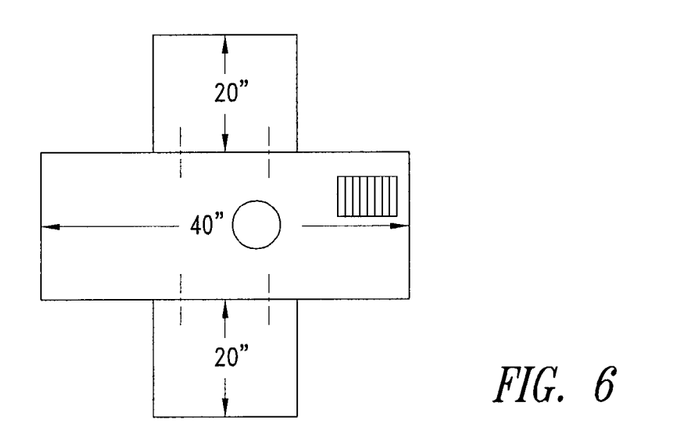
FIG. 6 is a plan view of a wind setup of a container solution.

If a plurality of containers are required for transporting the whole of the wind power installation, they can also be connected together to develop an overall foundation, for example to define a T-shaped structure or a crossed structure, as shown in FIG. 6. If then such containers are filled with sand, concrete or water, that foundation mass is sufficient to afford an adequate foundation for the entire wind power installation.

To enhance the stability of the foundation it may certainly be appropriate to also provide stiffening members or bracing members within the container, for example from mutually opposite container walls or between adjacent container walls, so that deformation of the container due to the forces applied to the foundation is reliably avoided.

Figure 7:
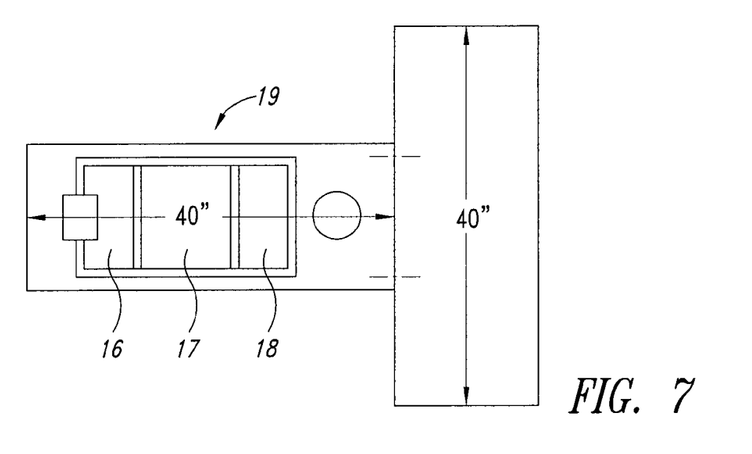
FIG. 7 shows an alternative solution to FIG. 6.

In the variant shown in FIG. 7 the foundation containers are let into the ground and access for controlling and regulating parts of the wind power installation is by way of steps which are let into the container at the top side thereof and which permit a descent into the space inside the container.

It will be appreciated that it is also possible for two containers to be disposed in mutually superposed relationship, wherein the upper one forms the space in which the parts such as switching cabinets or devices 16, power modules 17, or the transformer 18 and so forth are positioned so that the container then forms a pure 'foundation container'.

If there is sufficient internal container space 19, that internal space can also be used for providing the space for a relatively simple habitation or an operating room.

For remote monitoring of the wind power installation, it is already possible for suitable telecommunication equipment (for example a satellite telephone) to be fitted to the wind power installation at the factory so that the installation of such equipment is also no longer necessary when erecting the wind power installation.

The described wind power installation according to the invention is distinguished in that it can also be set up and assembled at the remotest location without special expensive crane equipment and that it does not even require specially trained expert personnel for the assembly procedure if the essential components are already in a finished pre-assembled condition and only have to be put together on site or if it is only necessary for individual plugs to be plugged together on site.

With a pylon height of between about 30 and 50 m, the wind power installation according to the invention can certainly involve a power of between 100 and 300 kW or more. It is possible to use a pylon in the form of a conventional steel tube structure as has previously already been used in wind power installations.

Particular advantages of the wind power installation according to the invention however are also that a foundation no longer has to be specifically built for setting up the wind power installation, but such foundation is afforded by the transport container itself, in which the individual components of the installation are transported. If the foundation container or containers is or are then provided with weighting, the design which is calculated at the factory thus ensures that operation far from any civilization is also certain to be possible and there is no fear of the wind power installation falling down.

All tools which are required when erecting the wind power installation are also carried in the containers for transporting the individual components of the wind power installation so that erection of the wind power installation can be effected without any problems, even in countries in which such special tools are not available. Suitable replacement material (for example lubricating greases, lines, securing means, replacement modules and so forth) can also be transported in the same manner and disposed in a suitable replacement part chamber of the container.

Accordingly, for erecting the wind power installation according to the invention, it is only necessary to transport the individual containers. Each container has all the components of the wind turbine, in addition to having all the tools to erect, electrically, connect, and service the wind turbine. As sufficient transport capacity is to be found worldwide in all countries and in particular such transport means with which standard containers can be transported are also available, transport of the wind power installation to the site for erection thereof is always guaranteed.

The described solution involving a wind power installation in which all components thereof are transported in containers can be supplemented by a large number of devices and elements, wherein such devices and elements are already fixedly placed in the containers at the factory—if necessary—and also all connections in respect of those devices and elements can be finished at the factory, if they require power in operation, so that operation of the devices and elements set forth hereinafter is thus possible.

By way of example the following appropriate additions to the above-described base module should be particularly mentioned: water pump, brackish water processing installation, sea water desalination installation, solar devices, either for producing hot water or for additional power generation, water tank for the storage of a given amount of water and other liquid, telecommunication apparatuses, accumulators which provide a power supply if the wind power installation is not in operation, a diesel/vegetable oil generator, a heat exchanger, an air dehydration unit for obtaining water from air, a motor or engine, a water sterilization station, and an electrolysis apparatus for producing hydrogen. Finally it may also be appropriate for the free space which still remains in a container to be fitted with a living unit, that living unit includes a minimum standard in terms of habitation equipment which makes a stay there and self-sufficiency possible. In addition the containers may already include upon transportation thereof several 100 m of power cable with suitable cable and plug connections and other material which permit the construction at least of a local network. In the event that pump power is required, it is also advantageous if several meters of hose, for example 100 m and more, are also transported in containers so that water can be pumped over a certain distance.

In regard to all the above-mentioned items of equipment and elements, it can also be assumed that the overall structure and overall operational startup should be possible even if a suitable supporting technology is not available at the location of production. That means in specific terms that as far as possible all apparatuses for constructing and starting up the wind power installation and also the above-mentioned elements should also be supplied. That includes in particular also tools as well as operating instructions so that the modular system according to the invention which can be expanded by a plurality of the above-mentioned apparatuses and elements can be set in operation.

Insofar as standard containers are used and the normal stability and stiffening thereof is not adequate for them to function as a foundation for the wind power installation, those containers should already be provided at the factory in the interior thereof with a stiffening means, for example a stiffening frame or stiffening plates or stiffening structures in order to ensure the required adequate stability.

Figure 8:
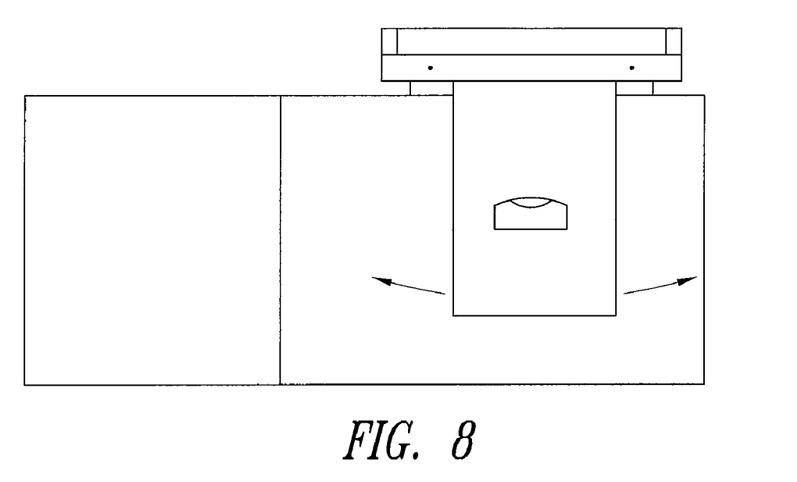
FIG. 8 shows a view in cross-section through a container according to the invention and a lowermost pivotable pylon segment.

It is also appropriate for leveling devices to be provided in the container so as to ensure that the pylon of the wind power installation is set up exactly vertically. If the terrain on which the wind power installation is set up should be uneven, it is also possible for a container to be set up in an uneven position if the apparatus for receiving the pylon is adjustable to a vertical position. That can be ensured for example by the container accommodating a fixed pylon segment which is adjustable in the vertical orientation thereof, in which case after vertical orientation of that pylon segment, the pylon of the wind power installation is placed thereon. That lowermost pylon segment which is provided in the container can be fixed in its vertical orientation in the most widely varying fashions, for example by the lowermost pylon segment being concreted in position with concrete 21 within the container or fixed to bracing members in some other fashion.

If a plurality of containers are to be joined together so as to ensure the best possible foundation structure for the wind power installation, suitable connection between the containers should also be possible, and for that purpose the appropriate devices for connecting the containers—at whatever locations—should already be provided at the factory or the connecting elements for connecting the containers together should be supplied with the other components so that easy assembly is possible.

If the wind power installation according to the invention is to be set up on a rocky substratum, it is also appropriate for those materials which permit the containers to be braced to the substratum also to be transported with the wind power installation.

The support frame which is necessary under some circumstances for erecting the wind power installation can also be of such a configuration that under some circumstances it can be assembled in modular manner on site (bar structure) and should be suitably provided with adequate stiffening members which permit secure erection of the wind power installation. After erection of the wind power installation, the support frame can also be used to accommodate the power cable which extends from the wind power installation so that the support frame at the same time also already forms the first power mast for which the power produced by the wind power installation can be fed into the network.

If necessary, it should also be possible that solar devices can be fixed to the top side of the containers, if a photovoltaic element is used, it should be capable of being coupled to the regulating and circuitry electronics of the wind power installation so that the electrical current of the photovoltaic arrangement can be fed into the network or into the accumulators or the further items of equipment.

If necessary one of the containers can also accommodate a network transformer station which is needed for operation of a power network.

In order to permit reliable operation of the wind power installation it should always be operated in such a way that it is not operated in the limit range of its mechanical or electrical loading. Preferably therefore operation is to be recommended in a range which is between 20 and 30% or more below the mechanical or electrical limit range. Losses that this entails in terms of efficiency of the wind power installation are to be accepted in order to guarantee very long-term and almost maintenance-free operation of the wind power installation. The above-indicated concept is based on the notion that, in the case of relatively small installations, under some circumstances a repair procedure is scarcely worthwhile or is often not possible for the most widely varying reasons. Therefore preference is to be given to reliable operation of the overall wind power installation, ahead of maximizing energy generation.

For the above-mentioned reasons it is also to be provided that remote maintenance can be implemented, as far as possible.

Finally, for the wind power installation according to the invention, it is also advantageous if the variation in the very small parts, for example screws, plugs and so forth, which are required for erecting and starting up the wind power installation, is reduced to a minimum. In addition the very small parts should as far as possible be standard parts so that the furnishing of replacements for very small parts is possible at any time.

Finally the overall structure of the wind power installation should be such that damage-free dismantling of the entire installation and further transport thereof in the containers and re-use of the entire installation are also possible.

If multi-story steel tubes are used for the pylon of the wind power installation, it is also advantageous if at least two stories can be fitted one into the other in order in that way to dispose those stories in the container in as space-saving manner as possible. As the pylon of a wind power installation is usually of a markedly smaller diameter at the upper end than at the lowermost end, care is therefore to be suitably taken to ensure when designing the tower that the outer diameter of the uppermost story is less than the inside diameter of the lowermost story of the pylon.

If possible the rotor blades should also involve outside dimensions such that at least one of the rotor blades can be fitted in a pylon portion during transport.

Units of the wind power installation such as for example the transformer, accumulators or one of the above-mentioned supplementary apparatuses and elements which are of a relatively high weight should already be fixedly anchored in the container at the factory so that, after the wind power installation has been set up, those components no longer have to be moved in order to bring them into operation. That structure also has the advantage that all cablings and connections between those units can then already be definitively implemented at the factory. It is then only still necessary to provide for the external connection of those units of the wind power installation to the generator thereof on the one hand or to the network or other apparatuses and elements to be driven (see above) on the other hand.

For the connection, it should be possible to have recourse very substantially to plugs which are also supplied in an already prefabricated condition and which are of such a configuration that misconnection is not possible even by non-experts. That can be ensured if the plugs are of non-unitary dimensions so that a plug can be fitted together only with a single corresponding counterpart contact member. Finally, all parts which have to be manually moved should be provided with suitable gripping points so that the entire construction operation is possible with a minimum number of people, for example between 15 and 20 men.

The above-described solution according to the invention is particularly suitable for being used in research stations and remote areas and also for the construction of local networks.

The nominal power of the wind power installation should be in the range of between 50 kW and 500 kW, preferably approximately in the range of between 100 and 200 kW. As the rotor blades are also to be transported in the containers, the length thereof, insofar as the rotor blades are in one piece, is restricted to the internal dimension of the containers, in which respect it is certainly possible to provide between the hub and the wind power installation and the rotor blade root blade adaptors of a blade length which can provide for an increase in the overall diameter of the wind power installation. For regulating the wind power installation, it is possible to use all known technologies such as stall regulation or pitch, as means for fixing the rotor blades of the wind power installation. Transmission arrangements should be eliminated as far as possible in the wind power installation, it is precisely transmission arrangements in wind power installations that represent the portal which affords by far the most frequent reason for the failure of a wind power installation.

Figure 9:
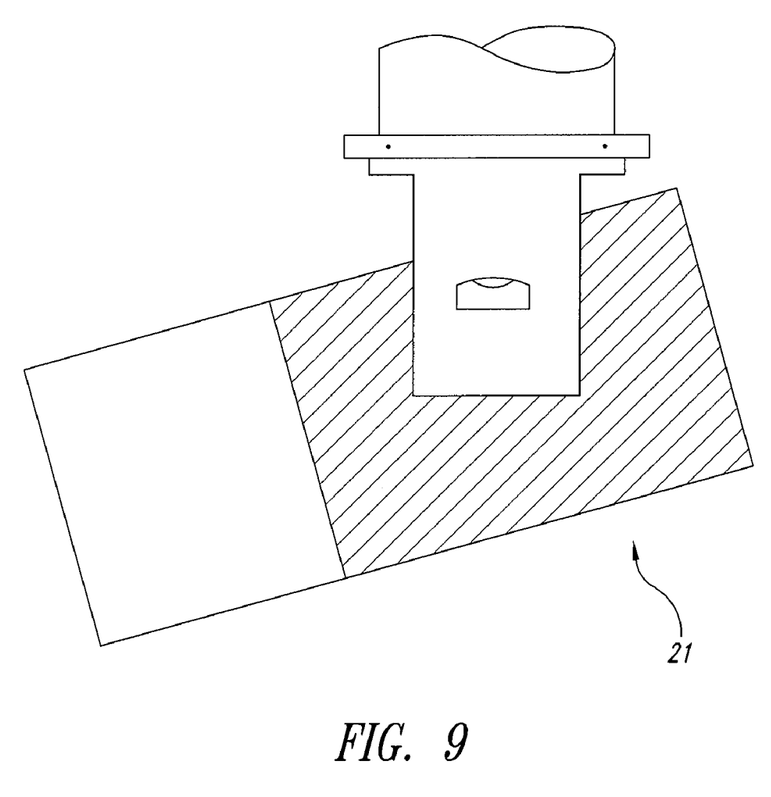
FIG. 9 shows an arrangement of the pylon (FIG. 8) with inclined positioning of the container (shown in an exaggerated view).

FIG. 8 shows a further alternative embodiment of the invention. In this case not only is the pylon accommodated by the container but the pylon is mounted pivotably through certain degrees of angle and can be accommodated by a chamber in the container. If now the wind power installation is erected and it is not possible for the container to be set up absolutely flat, then erection of the wind power installation with a completely vertically oriented pylon is nonetheless possible, as shown in FIG. 9. In the lower region the pylon of the wind power installation has elements with which the vertical orientation thereof can be exactly established (for example a spirit level) and when, after container placement, the lower pylon segment is vertically oriented, the corresponding container chamber can be filled with sand or concrete or another filling material 21 so that an adequate foundation structure for the pylon is guaranteed and the entire wind power installation can be constructed on the lowermost pylon segment.

It will be self-evident that, when the lowermost pylon segment is mounted pivotably, it is also possible to provide suitable arresting devices so that, after orientation of the lowermost pylon section in a vertical position, the oriented position can be retained.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for production of a wind power installation having a plurality of installation components including at least a rotor, a generator, a machine casing and a pylon, wherein individual installation components are transported by means of a container or a plurality of containers to a building site of the wind power installation and the container or containers are such that they accommodate the pylon of the wind power installation and form a foundation of the wind power installation, comprising sinking the foundation container or containers into a hole in the ground prior to setting up the wind power installation.

2. The process of claim 1, further comprising:
erecting the pylon of the wind power installation using a cable winch which has a motor or manual drive.

3. A method for production of a wind power installation having at least a rotor, a generator, a machine casing, and a pylon, the method comprising:
placing at least one container into the ground so that the at least one container is a foundation for the wind power installation, the at least one container dimensioned to contain the rotor, the generator, the machine casing, and the pylon; and
affixing a lower part of the pylon on a bottom of the at least one container to set up the wind power installation.

4. The method according to claim 3, further comprising:
transporting the at least one container containing the rotor, the generator, the machine casing, and the pylon therein to a building site of the wind power installation.

5. The method of claim 3, further comprising:
erecting the wind power installation by means of a cable winch which has a motor or manual drive.

6. The method of claim 3, further comprising:
forming a hole sized to conform with the at least one container.

7. The method of claim 3, further comprising:
filling the at least one container with a medium so that the at least one container is stabilized in the ground.

8. The method of claim 3, further comprising:
coupling a further container to the at least one container so that the containers are placed into the ground.

9. A wind power installation, comprising:
at least a rotor, a generator, a machine casing, and a pylon; and
at least one container sunk into the ground so that the at least one container is a foundation for the wind power installation, the at least one container dimensioned to contain the rotor, the generator, the machine casing, and the pylon.

10. The wind power installation of claim 9, further comprising:
a means for receiving arranged on a top side of the at least one container and operable to receive a lower part of the pylon; and
a means for attaching the pylon on a bottom of the at least one container.

11. The wind power installation of claim 9, further comprising:
a cable winch operable to erect the pylon.

* * * * *